US009908583B2

(12) United States Patent
Matheson et al.

(10) Patent No.: US 9,908,583 B2
(45) Date of Patent: Mar. 6, 2018

(54) BICYCLE REAR SUSPENSION WITH A TWO AXIS WHEEL PATH

(71) Applicants: W. Hank Matheson, San Francisco, CA (US); Jonathan R. Heim, Pacifica, CA (US)

(72) Inventors: W. Hank Matheson, San Francisco, CA (US); Jonathan R. Heim, Pacifica, CA (US)

( * ) Notice: Subject to any disclaimer, the term of this patent is extended or adjusted under 35 U.S.C. 154(b) by 0 days.

(21) Appl. No.: 14/581,923

(22) Filed: Dec. 23, 2014

(65) Prior Publication Data
US 2015/0115569 A1   Apr. 30, 2015

Related U.S. Application Data

(63) Continuation of application No. PCT/US2013/047392, filed on Jun. 24, 2013.

(60) Provisional application No. 61/663,559, filed on Jun. 23, 2012.

(51) Int. Cl.
*B62K 25/04* (2006.01)
*B62K 25/28* (2006.01)
*B62K 3/02* (2006.01)

(52) U.S. Cl.
CPC ............... *B62K 25/04* (2013.01); *B62K 3/02* (2013.01); *B62K 25/286* (2013.01)

(58) Field of Classification Search
CPC ......... B62K 25/04; B62K 3/02; B62K 25/286
See application file for complete search history.

(56) References Cited

U.S. PATENT DOCUMENTS

| 4,735,277 | A | * | 4/1988 | Prince | B62K 25/04 180/227 |
| 5,611,557 | A | * | 3/1997 | Farris | B62K 3/04 280/275 |
| 5,791,674 | A | * | 8/1998 | D'Aluisio | B62K 25/286 180/227 |
| 6,045,470 | A | * | 4/2000 | Wilcox | B62M 9/131 474/69 |
| 6,203,042 | B1 | * | 3/2001 | Wilcox | B62K 25/286 280/275 |
| 6,279,703 | B1 | * | 8/2001 | Mete | F16F 9/44 188/319.1 |
| 6,361,059 | B1 | * | 3/2002 | Ellsworth | B62K 25/30 280/284 |
| 7,100,930 | B2 | * | 9/2006 | Saiki | B62K 25/286 280/284 |
| 7,395,892 | B2 | * | 7/2008 | Alonzo | B62K 25/286 180/227 |
| 7,722,072 | B2 | * | 5/2010 | Hoogendoorn | B62K 25/286 280/284 |
| 8,002,301 | B2 | * | 8/2011 | Weagle | B62K 25/286 180/227 |

(Continued)

OTHER PUBLICATIONS

Bicycle Fabrications (Feb. 2, 2011).*

*Primary Examiner* — Anne Marie M Boehler
*Assistant Examiner* — Gabriela C Craciun
(74) *Attorney, Agent, or Firm* — Levine Bagade Han LLP

(57) ABSTRACT

Disclosed herein are rear suspension systems for bicycles that coupling the rear wheel of the bicycle to the bicycle frame through a swing arm assembly. The structures disclosed herein allow for independent movement of a swing arm assembly in both a vertical and horizontal directions.

18 Claims, 17 Drawing Sheets

(56) References Cited

U.S. PATENT DOCUMENTS

| | | | |
|---|---|---|---|
| 8,006,993 B1* | 8/2011 | Chamberlain | B62K 25/286 280/281.1 |
| 8,066,297 B2* | 11/2011 | Beale | B62K 25/286 280/284 |
| 8,136,829 B1* | 3/2012 | Kang | B62K 25/286 280/275 |
| 8,348,295 B2* | 1/2013 | Beaulieu | B62K 25/28 280/283 |
| 8,382,136 B2* | 2/2013 | Beale | B62K 19/18 280/275 |
| 8,439,383 B2* | 5/2013 | Talavasek | B62K 25/286 280/275 |
| 8,585,070 B2* | 11/2013 | Beale | B62K 25/286 280/284 |
| 2002/0084619 A1* | 7/2002 | Odom | B62K 21/14 280/276 |
| 2004/0061305 A1* | 4/2004 | Christini | B62K 25/286 280/284 |
| 2006/0061059 A1* | 3/2006 | Lesage | B62K 25/286 280/284 |
| 2006/0071442 A1* | 4/2006 | Hoogendoorn | B62K 25/286 280/275 |
| 2008/0217882 A1* | 9/2008 | Beaulieu | B62K 25/28 280/261 |
| 2008/0252040 A1* | 10/2008 | Colegrove | B62K 25/04 280/284 |
| 2008/0258427 A1* | 10/2008 | Buckley | B62K 25/286 280/284 |
| 2009/0261557 A1* | 10/2009 | Beale | B62K 19/18 280/284 |
| 2009/0277732 A1* | 11/2009 | Trujillo | F16F 9/504 188/266.5 |
| 2010/0059965 A1* | 3/2010 | Earle | B62K 25/286 280/284 |
| 2010/0109282 A1* | 5/2010 | Weagle | B62K 25/286 280/284 |
| 2010/0327542 A1* | 12/2010 | Hara | B62J 99/00 280/5.503 |
| 2011/0227312 A1* | 9/2011 | Earle | B62K 25/20 280/283 |
| 2011/0233892 A1* | 9/2011 | Domahidy | B62K 25/286 280/284 |
| 2012/0007327 A1* | 1/2012 | Talavasek | B62K 25/20 280/124.1 |
| 2012/0223504 A1* | 9/2012 | Antonot | B62K 25/286 280/284 |
| 2013/0093160 A1* | 4/2013 | Alsop | B62K 25/286 280/284 |
| 2014/0001729 A1* | 1/2014 | Hudec | B62K 25/28 280/283 |
| 2014/0210180 A1* | 7/2014 | Hudak | B62K 25/04 280/274 |

* cited by examiner

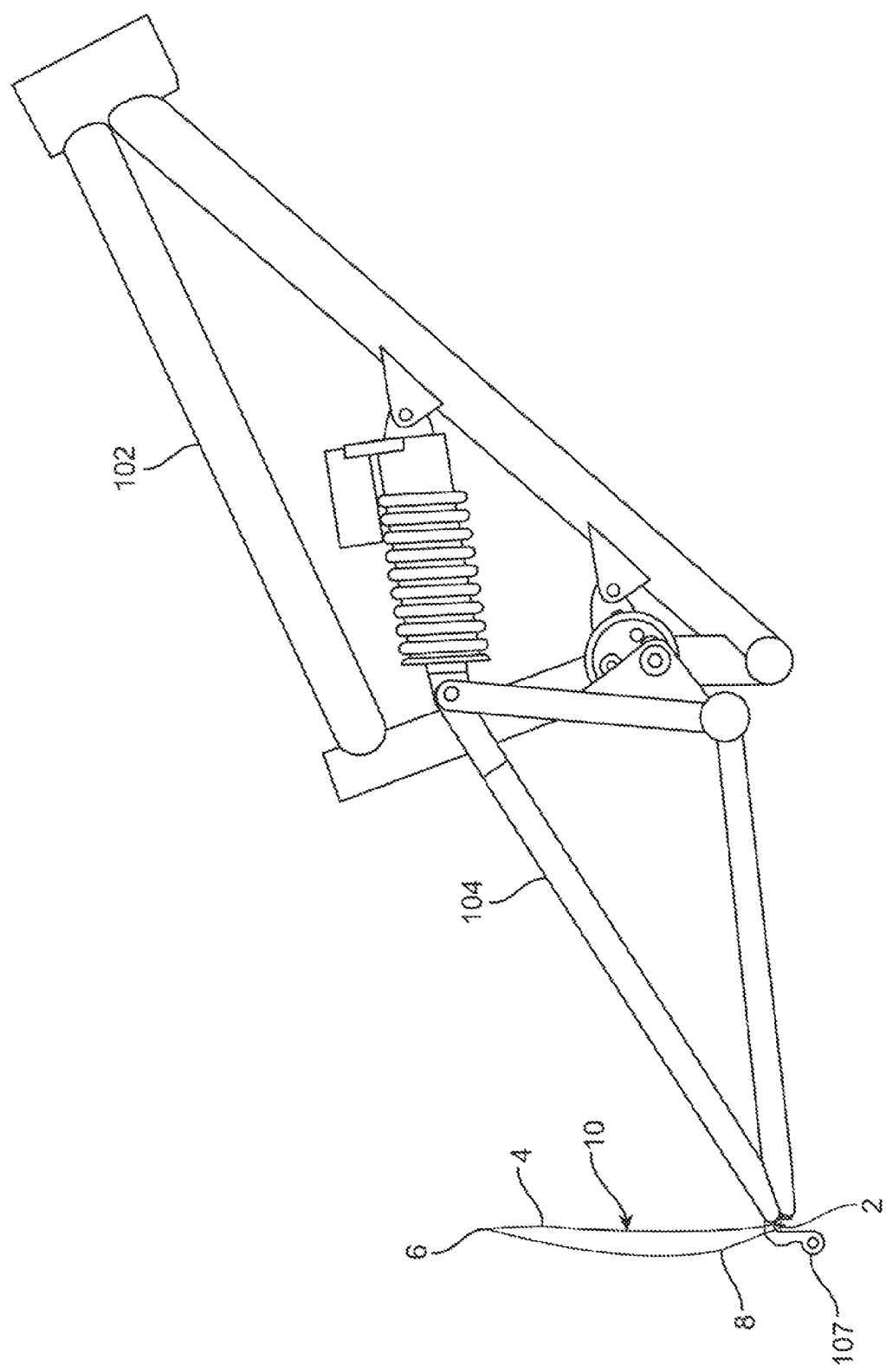

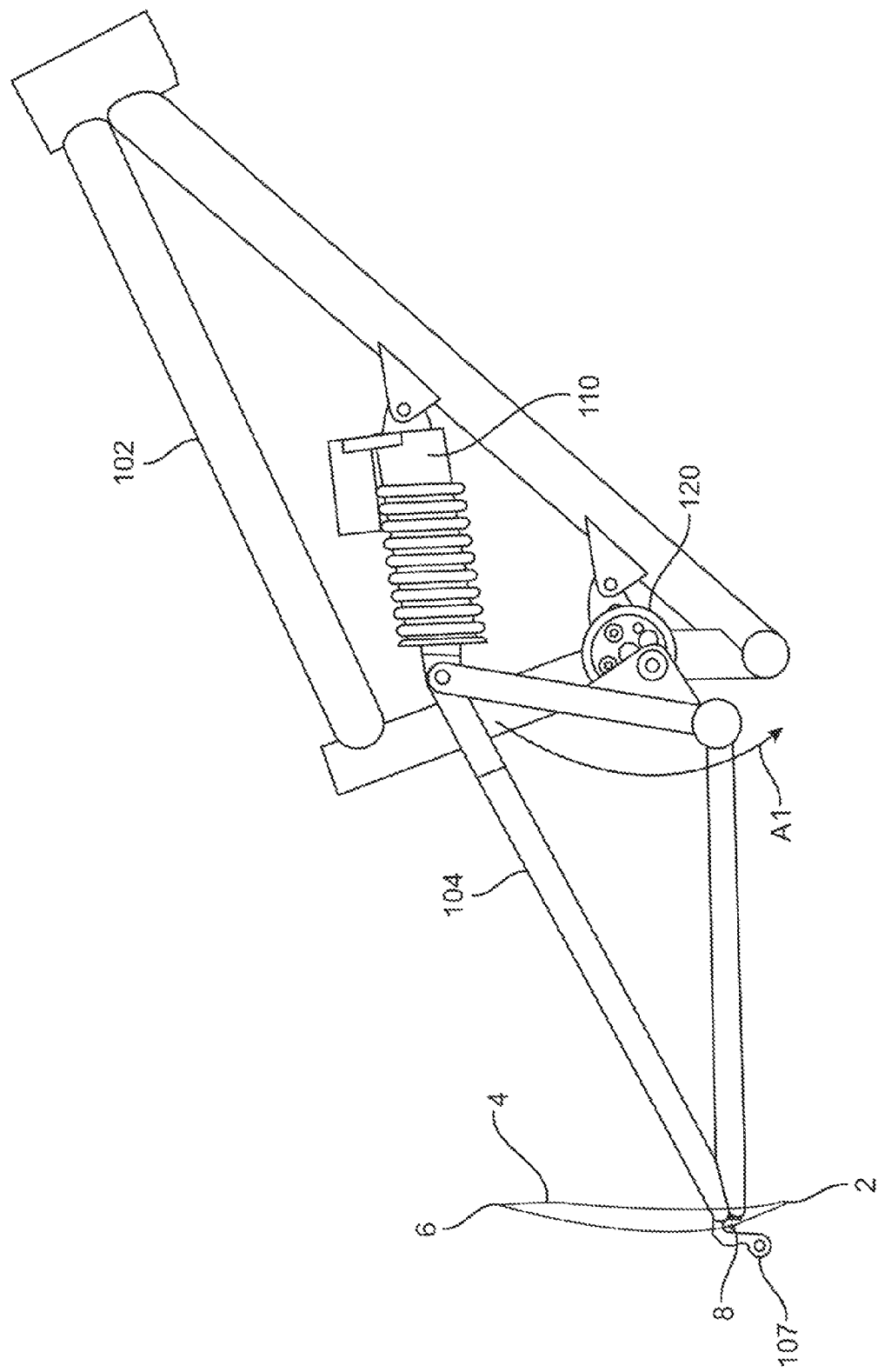

BICYCLE REAR SUSPENSION WITH A TWO AXIS WHEEL PATH

CROSS-REFERENCE TO RELATED APPLICATIONS

This application is a continuation of International Application No. PCT/US2013/047392 filed Jun. 24, 2013, which claims benefit of priority to U.S. Provisional Application No. 61/663,559 filed Jun. 23, 2012 the contents of which are incorporated herein by reference in their entirety.

BACKGROUND OF THE INVENTION

High-end bicycles, especially those used for off-road riding, typically have both rear and front suspension systems to assist in traversing uneven or rough terrain. Downhill mountain racing bikes, freeride bikes, trail bikes and recreational bikes can be subjected to high speeds where the bumpier terrain can increase the chance that the rider can lose control. The combination of the terrain and speed conditions can result in rear wheel movement vectors including rearward direction impact vectors in addition to vertical direction vectors.

Many rear suspension systems designed for freeriding and other biking applications are known by those skilled in the art. Such systems generally include a rear suspension permitting a limited degree of travel of the rear wheel relative to the bicycle frame and a rear shock absorber that absorbs or dampens suspension forces acting on the wheel. The range of rear wheel travel permitted by existing suspension systems varies, but is typically within the range of about 5 to 12 inches measured vertically (although some designs permit travel outside this range).

The dramatic growth of rear wheel suspension on such bicycles is partially due to the fact that rear suspension systems not only increases rider comfort, since the suspension dampens jarring forces from rough terrain, but also prevents the forces or movement vectors from being directly transferred to the rider's seat. The growth of these suspensions can also be attributed to the need for increase traction and control when the rear wheel suspension acts to keep the rear wheel in better contact with the trail surface after encountering the rough terrain.

There is a need for improved suspensions for the rear wheel of bicycles and/or two-wheeled vehicle. More particularly, a need remains for suspensions that are adapted or configured for off-road two wheel vehicles (hereafter referred to as bicycles or bikes, including motorized as well as manual powered). The need includes suspensions that allow the rear wheel to move in two axes, or degrees-of-freedom (DOF) relative to the remainder of the frame of the bike.

BRIEF SUMMARY OF THE INVENTION

This invention relates to the rear suspension of bicycles or motor driven cycles. The present invention comprises improvements to a bicycle suspension system with a two-axis rear wheel path for rearward compliance in addition to the main vertical compliance for improved control in bumpy, steep, high-speed off road terrain conditions. The following examples illustrate simple, light and compact improvements that can optionally be manufactured for less expense.

The present disclosure includes an improved a bicycle suspension system for use with bicycle having a main frame assembly and a swing arm assembly, the system allowing improved movement of a wheel coupled to the swing arm assembly.

In one example, the improved bicycle suspension system includes a first deflection device coupling the swing arm assembly to the main frame assembly at a first coupled location, where the first deflection device is configured to allow relative motion between the swing arm assembly and the main frame; a second deflection device coupling the swing arm assembly to the main assembly at a second coupled location; where a frame end of the first deflection device is pivotally coupled to the main frame assembly and a swing arm end of the first deflection device is pivotally coupled to the swing arm assembly; and where a frame portion of the second deflection device is coupled to the main frame assembly and a swing arm portion of the second deflection device is coupled to the swing arm assembly such that the second deflection device permits relative movement between the swing arm assembly and the main assembly independently in either a horizontal direction or a vertical direction. The term assembly and portion with regard to the main frame and swing arm are intended to be used interchangeably and include additional features or structures that can be incorporated to the respective part of the bicycle.

The horizontal direction can optionally comprise a horizontal arcing direction and/or the vertical direction can optionally comprise a vertical arcing direction.

In one variation, the second deflection device comprises at least a first pivot bearing located at the swing arm portion of the second delivery device, where the first pivot bearing allows movement of the swing arm assembly in the vertical direction upon rotation of the swing arm assembly about an axis of the first pivot bearing.

Variations of the suspension also includes where the second deflection device comprises a shock member coupled to the main frame assembly at the frame portion of the second deflection device, where deflection of the shock member results in movement of the swing arm in the horizontal direction.

In certain variations of the second deflection device includes a first pivot bearing is mechanically coupled to a portion of the shock member. In some cases the second deflection device includes a second pivot bearing coupling the first pivot bearing to the portion of the shock member, where rotation of the second pivot bearing is driven by torsion of the portion of the shock member, where the rotation of the second pivot bearing and rotation of the first pivot bearing permits movement of the swing arm in the horizontal direction.

One or more a pivot bosses can be coupled to the shock member the pivot boss also being coupled to the second pivot bearing such that deflection of the shock member causes movement of the second pivot bearing. In additional variations, a frame plate is coupled to the main frame assembly at the frame portion of the second deflection device, where the frame plate comprises defines an opening that limits movement of the pivot boss or second pivot bearing to limit movement of the shock member. For example, the opening can be any opening that provides desired restraint or movement of the shock member. For instance, the opening can comprise a shape selected from an ellipse, a circular opening, and a slot.

The suspensions described herein can include shock members where a first portion of the shock member comprises at least one opening or cavity that increases deflection of at least a second portion of the shock member.

The first deflection device can comprise a shock absorber or damper. Such structures can include structures selected from the group consisting of a hydraulic, pneumatic, coil sprung, non-spring based, elastomeric structures.

The present disclosure also includes a bicycle comprising: a main frame assembly; a swing arm assembly, the swing arm assembly having a rear wheel axis portion for affixing a rear wheel thereto; a first deflection device mechanically coupling the swing arm assembly to the main frame assembly at a first location; a second deflection device mechanically coupling the swing arm assembly to the main assembly at a second location; where a frame end of the first deflection device is pivotally coupled to the main frame assembly and a swing arm end of the first deflection device is pivotally coupled to the swing arm assembly, where the frame end and swing arm end of the first deflection device are moveable relative to each other; where a frame portion of the second deflection device is coupled to the main frame assembly and a swing portion of the second deflection device assembly is coupled to the swing arm assembly such that the second deflection assembly permits relative movement between the swing arm assembly and the main assembly independently in either a horizontal direction or a vertical direction.

Another variation of the invention includes a bicycle suspension component for use with a bicycle having a main frame assembly and a swing arm assembly and a linear damper device pivotally coupling to both the swing arm assembly and the main frame assembly. One example of such a suspension component includes a frame portion for affixing to the frame assembly; a swing arm portion for affixing to the swing arm assembly, where the swing arm assembly includes a rear axle; and where when the frame portion is affixed to the main frame assembly and the swing arm portion is affixed to the swing arm assembly the main frame assembly and the swing arm assembly are able to move independently in either a horizontal direction or a vertical direction.

The bicycle, bicycle component, and/or bicycle suspension system disclosed or discussed herein are examples of the invention described herein. It is contemplated that combinations of aspects of specific embodiments or combinations of the specific embodiments themselves are within the scope of this disclosure.

BRIEF DESCRIPTION OF THE SEVERAL VIEWS OF THE DRAWINGS

FIGS. 3A to 3D illustrate four positions of rear wheel axle movement and depicted curve to demonstrate movement of a rear axle of a dual suspension bicycle using the principles disclosed herein.

DETAILED DESCRIPTION OF THE INVENTION

Figure 1:
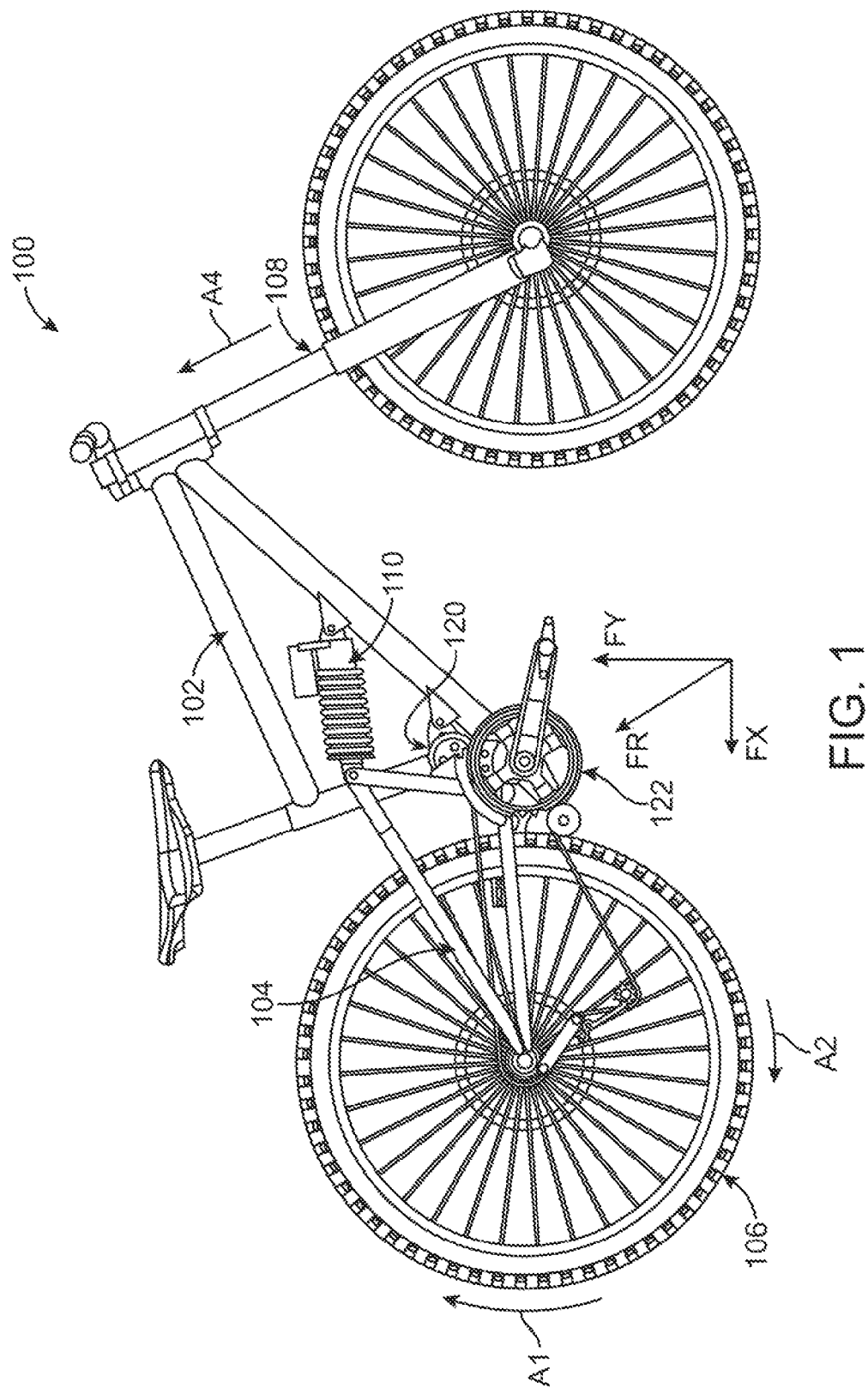
FIG. 1 illustrates an exemplary bicycle with one variation of a dual suspension configuration as disclosed herein.

FIG. 1 illustrates an exemplary bicycle 100 having a dual suspension configuration as disclosed herein. While the bicycle 100 is illustrated as a variation of a mountain bike configuration, it should be noted that the suspension design and other improvements discussed herein can be applied to any two wheel vehicle, including, motorized bicycles, manual bicycles, or other such vehicles where dual suspension is desired.

FIG. 1 shows the bicycle 100 including dual suspension assembly having certain features, aspects and advantages of preferred embodiments of the present invention. The overall bicycle 100 is described in general detail to assist in the understanding of certain features and advantages of the illustrated variation of the suspension design. Details of the bicycle 100 that are not described herein may be assumed to be of a conventional construction or a suitable alternative construction, such as those readily known by one of skill in the art. For example, the bicycle shown in FIG. 1 includes three main sections, a main frame assembly or portion 102 having a swing arm assembly 104 coupled thereto and a front fork assembly 108 located on an opposite side of the swing arm assembly 104. The front fork assembly 108 can include a steering bar and wheel.

As shown, the main frame portion or assembly 102 of the illustrated bicycle 100 couples to a swing arm assembly 104. The swing arm assembly 104 is also known as a rear frame assembly and is moveable relative to the main frame portion 102 due to the suspension system discussed below.

The swing arm assembly 104 supports a wheel 106 (in most cases a rear wheel). As noted herein, the illustrated configuration includes a dual suspension system that allows for relative movement between the main frame portion 102 and the swing arm assembly 104 especially in view of movement of the wheel 106. In this particular variation, the dual suspension comprises a first deflection device 110 and a second deflection device 120 each coupling the swing arm assembly 104 to the main frame portion 102 at different locations. In this example, the first deflection device 110 comprises a shock absorber assembly that travels along a first axis (i.e., the stroke of the shock absorber. As shown, the first deflection device 110 couples the main frame portion 102 to the swing arm assembly 104 at a first location. However, the location of the coupling can be varied as needed where the illustrated first location is shown for convenience only.

In the illustrated example, the second deflection device 120 permits relative movement between the swing arm assembly 104 and the main frame portion 102 independently in either a horizontal or vertical direction as shown by FX and FY. The independent movement in either the FX (horizontal) or FY (vertical) movement means that the second deflection device allows movement of the portion of the swing arm assembly coupled to the second deflection device 120 in either the FX or FY directions regardless of where the first deflection device 110 is in its stroke along the first axis.

FIG. 1 also illustrates two directions of wheel 106 movement encountered when the bicycle 100 is ridden under the conditions described herein. Direction A1 corresponds to the vertical path movement along the FY direction. Direction A2 corresponds to a relatively smaller amount of rear travel along the FX direction. FIG. 100 also illustrates an additional movement direction of A4, which occurs as a result of independent front wheel movement in response to forces acting on the wheel.

Figure 2A:
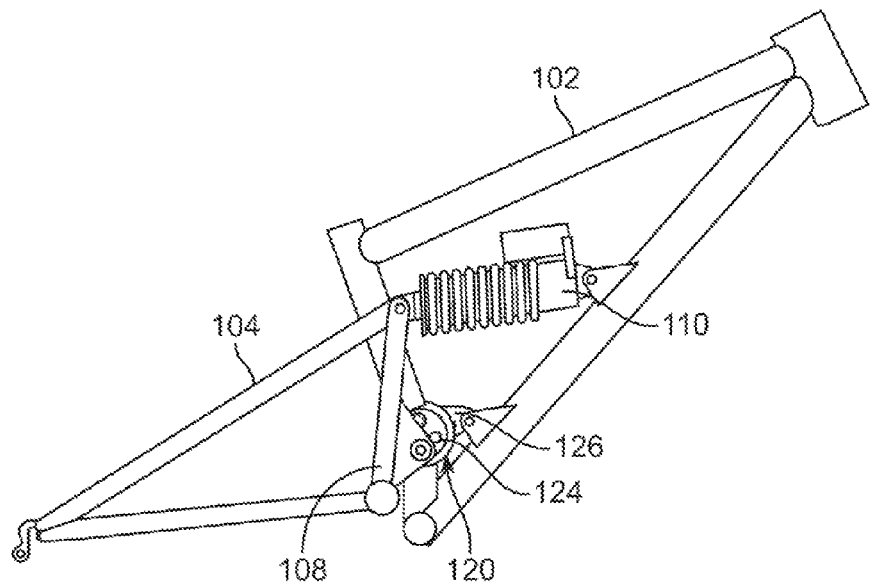
FIG. 2A illustrates a side view of a main frame and a swing arm of a bicycle of coupled by a first displacement device and a second displacement device.
Figure 2B:
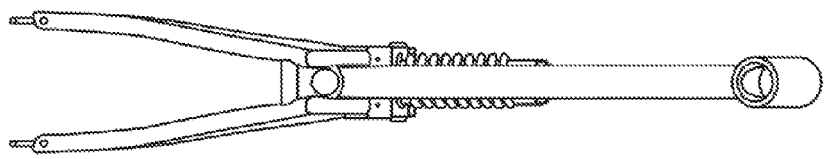
FIGS. 2B and 2C show respective top and front views of the bicycle structures shown in FIG. 2A.
Figure 2C:
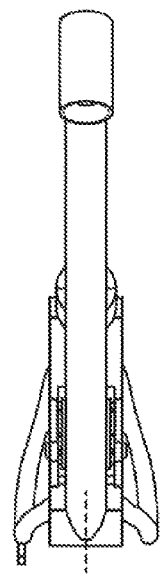

FIG. 2A illustrates a side view of the main frame 102 and swing arm 104 of the bicycle of FIG. 1 with various assemblies removed for purposes of illustration. As shown, the main frame portion 102 is coupled to the swing arm 104 via the dual suspension configuration including a shock absorber 110 coupled between the main frame 102 and swing arm 104. The coupling points can include any number of bearings at either end to permit movement of the shock absorber 110 along its stroke axis. The swing arm 104 is also coupled to the main frame 102 using a second deflection device 120. While variations of the second deflection device 120 are described below, the illustrated variation depicts the lower portion 108 of the swing arm 104 coupled to a link 124 that provides a rotational mount on the deflection device 120 so that the swing arm 104 is rotatably joined to the deflection device 120. Accordingly, one or more bearings can be used when fastening the swing arm 104 to the deflection device 120. FIG. 2A also shows a deflection portion or shock member 126 of the second deflection device 120. The deflection portion can comprise an elastomer or similar material that permits deflection in both axial and horizontal directions as described above as well as providing a damping function. In one variation, the elastomers allow for wide tuning options, simplicity, light weight, and no stiction from seals, and short lengths without custom shocks. One example of such an elastomer is polyurethane.

FIGS. 3A to 3D illustrate four positions of rear wheel axle 107 movement, depicted by curve 10 (having positions 2, 4, 6, and 8) when using a variation of the dual suspension configuration disclosed herein. It is noted that the maximum displacements of each deflection device affect the shape of curve 10. It is understood by those skilled in the relevant art that displacement of the rear wheel or axle 107 can be adjusted by varying the stroke of the each displacement device. Such adjustments affect the shape of curve 10.

Figure 3B:
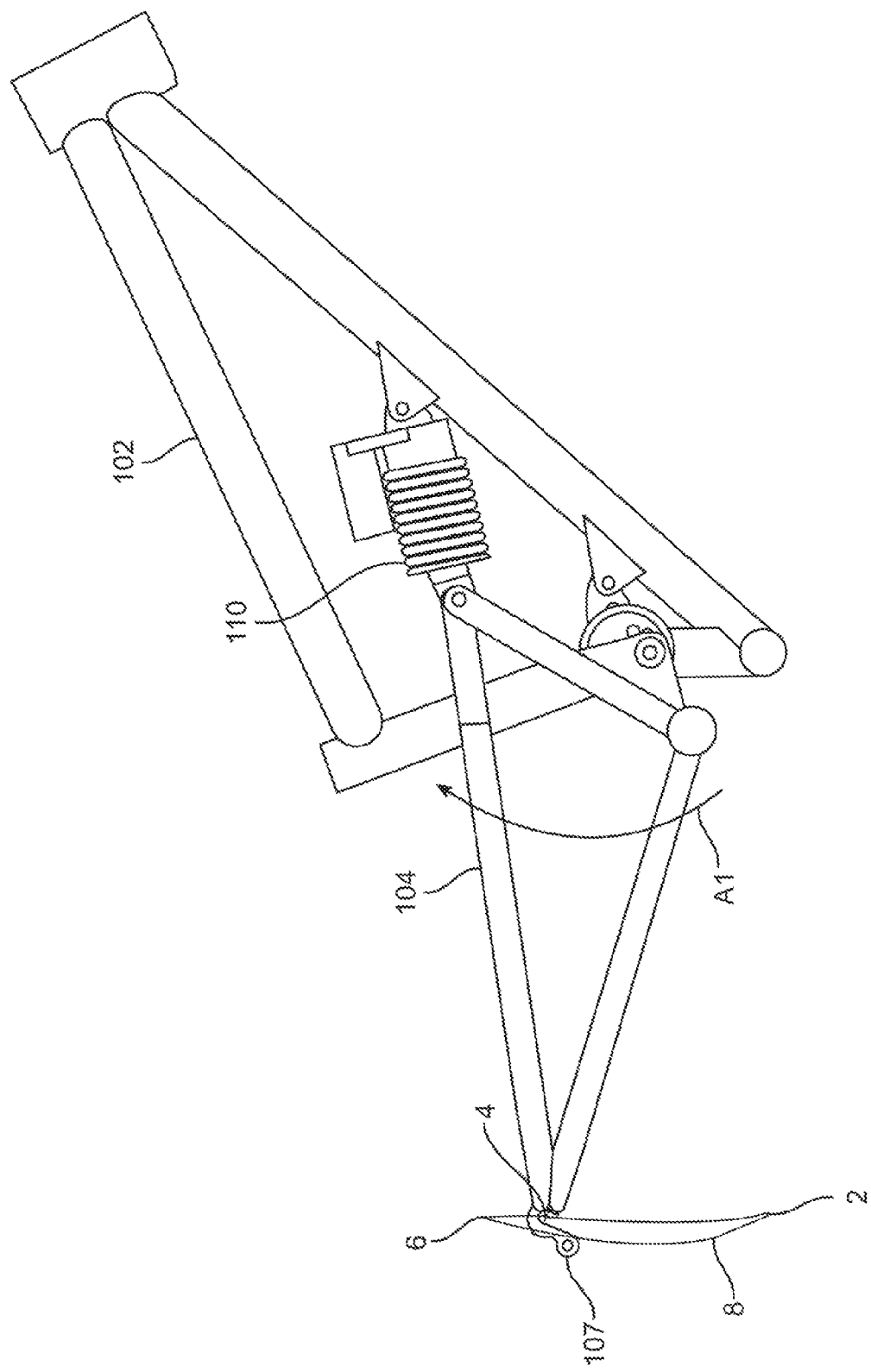
Figure 3C:
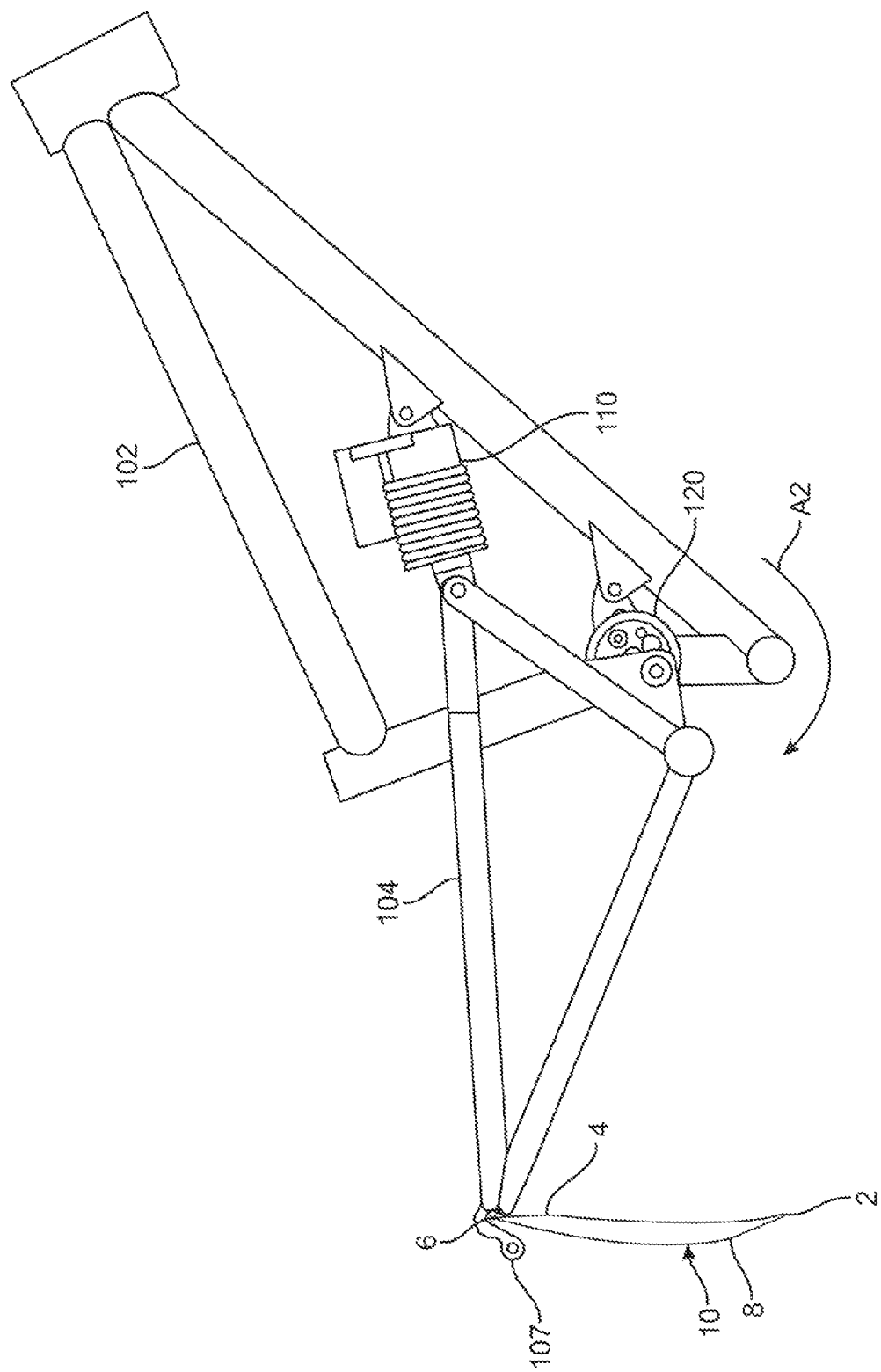

FIG. 3A represents an initial position 2 as a base for illustrating the deflection of the deflection devices. FIG. 3B illustrates the movement of axle 107 from position 2 to position 4 in response to displacement A1 (see also A1 from FIG. 1). As noted previously, A1 depicts vertical movement of the wheel or axle 107 in response to riding conditions. As shown in FIG. 3B moving rear axle 107 upwards to position 4. FIG. 3C illustrates an additional movement A2 acting on rear wheel or axle 107, which in turn causes deflection of the second deflection device 120 in a rearward direction along FX (see FIG. 1). This deflection of rear axle 107, while still under the influence of A1 causes rear axle 107 to move to position 6. However, movement of the second deflection device 120 can also occur independently of movement of the first deflection device 110.

FIG. 3D shows movement of rear axle 107 as force or deflection A1 is removed causing the rear axle 107 to move from position 6 to position 8. It is noted that, FIG. 3D shows second deflection device 120 in the same or similar position as that shown in FIG. 3BC.

Again, the dual suspension configuration permits fore and aft movement independent of up and down movement of the rear wheel axis 107/rear wheel 106. The ability to have such independent movement improves the shock absorbing and pivoting of the bicycle.

Figure 4A:
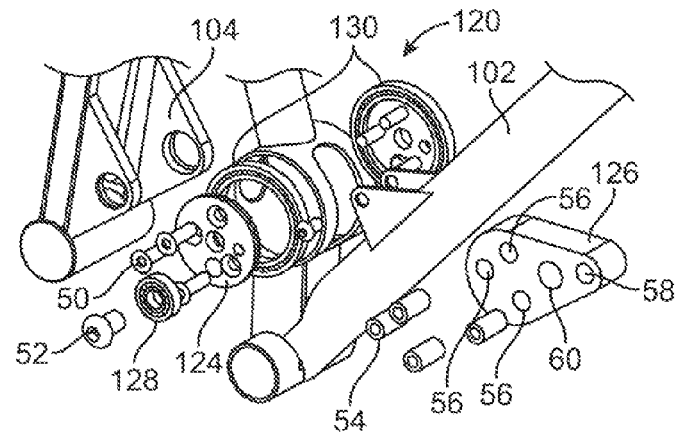
FIG. 4A illustrates an exploded view of a variation of the second deflection device.
Figure 4B:
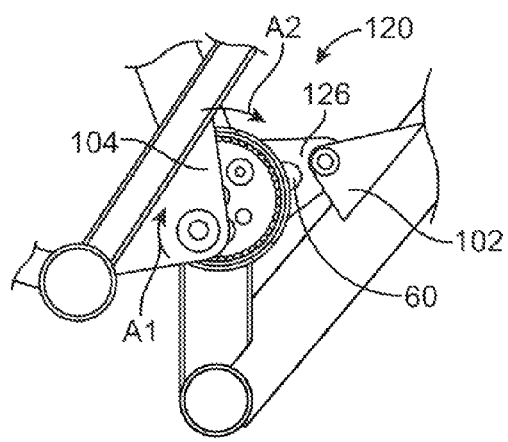
FIG. 4B illustrates relative movement of bearings used in the second deflection assembly.
Figure 4C:
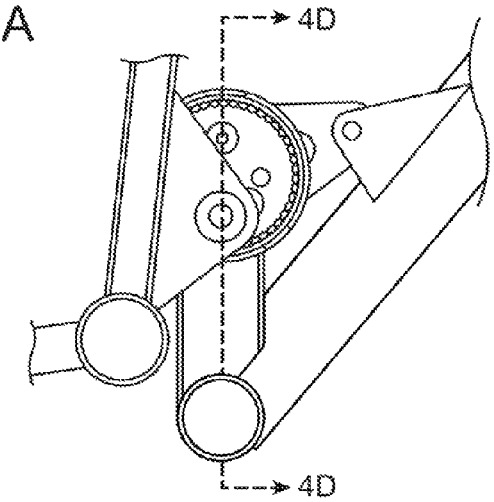
FIG. 4C shows a side view of the second deflection assembly of FIG. 4A.
Figure 4D:
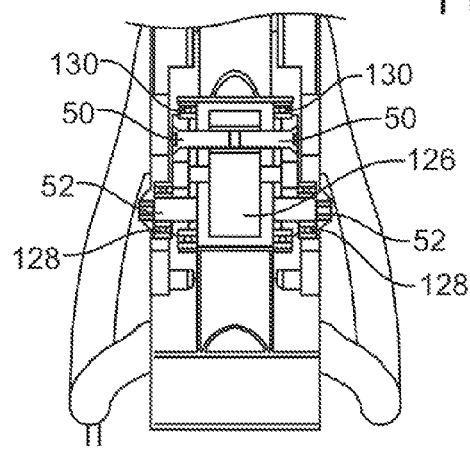
FIG. 4D shows a sectional view of the second deflection assembly taken long lines 4D-4D of FIG. 4C.

FIG. 4A illustrates an exploded view of a variation of the second deflection device 120, where FIG. 4B illustrates relative movement of bearings used in the second deflection assembly. Any of the bearings described herein can include conventional cartridge ball bearings or plane bearings. FIG. 4C shows a side view of the second deflection assembly and FIG. 4D shows a sectional view of the second deflection assembly taken long lines 4D-4D of FIG. 4C.

As shown, the second deflection device 120 can include a shock member 126 that physically couples the main frame portion 102 via any number of connection points. In the illustrated variation, the shock member 126 fastens to the main frame portion 102 via use of a fastener 50 positioned through opening 58. It should be noted that any number of bushings or spacers 54 can be used. The shock member 126 can be constructed from an elastomeric material where thickness, durometer, number of mounting points 58, as well as through holes 60 can be varied as needed to tune spring and damping rates to meet the desired performance characteristics of the suspension assembly. As previously discussed, the second deflection assembly 120 is also rotationally coupled to the swing arm 104. In this variation, the swing arm 104 is directly coupled to the second deflection device 120 using a first pivot bearing 128 that allows movement of the swing arm upon reaction of the rear wheel to direction A1 as previously discussed. FIG. 4B illustrates the direction of movement of swing arm 104 in response to movement A1. The first pivot bearing 128 is fastened to the second deflection device 124 via fastener 52 though any number of fasteners can be used.

FIG. 4A also shows fastener 52 and first pivot bearing coupled to a link plate 124. Link plate 124 is seated within a second pivot bearing 130 and secured thereto using fasteners 50 that extend through shock member 126. Movement A2 by the swing arm 102 in the FX direction causes rotation of second pivot bearing as shown in FIG. 4B. This rotation causes deflection of shock member 126 allowing for the rear frame assembly 104 to move as described above. It is noted that FIG. 4B illustrates the state depicted in FIG. 3C where the swing arm assembly is subject to movement A1 and A2. However, as noted above, the second deflection device can move in response to either A1 or A2. FIG. 4B also illustrates deformation of through-hole 60 as shock member 126 is deformed as a result of the movement of the swing arm 104. As noted above, the suspension system can be adjusted or tuned by varying the parameters of the shock member 126. Furthermore, movement of the swing arm 104 in either a horizontal directional arc or a vertical directional arc is accomplished by the ability of the second deflection device 120 to move in response to either A1 or A2.

Figure 5A:
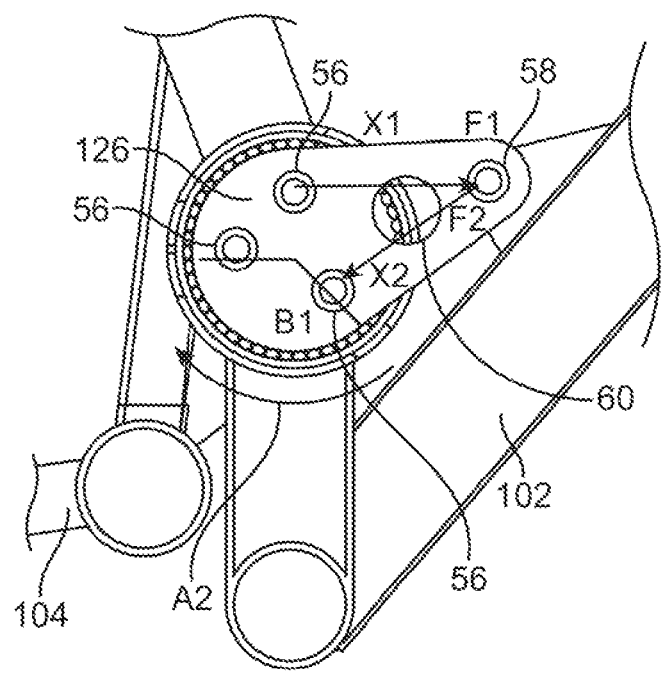
FIGS. 5A and 5B illustrates a partial sectional view of the second deflection device showing displacement of the shock member as movement A2 deforms the shock member.
Figure 5B:
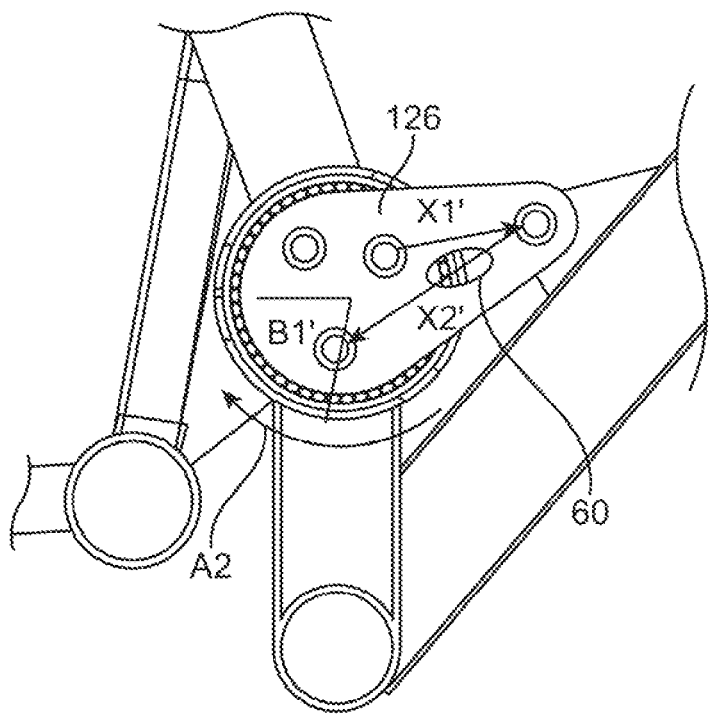

FIGS. 5A and 5B illustrates a partial sectional view of the second deflection device showing the shock member 126 as movement A2 deforms shock member 125 and allows movement of the swing arm 104 relative to the main frame 102. FIG. 5A illustrates the state of the shock member 126 prior to movement as well as distances X1 and X2 which represent the distance between mounting points 56 of the transfer plate and the mounting point 58 to the main frame 102. As movement along A2 occurs via link plate (not shown in FIGS. 5A and 5B), F1 places a portion of the shock member 126 in compression while F2 places another portion of the shock member 126 in tension. The result is that the shock member 126 undergoes a torsion to cause a radial dimension of as measured by B1 to decrease to that of B1' as shown in FIG. 5B. The resulting forces also cause distance X1 to decreases to X1', which corresponds to the portion of the shock member 126 placed in compression. Distance X2 increases to X2', which corresponds to the portion of the shock member 126 placed in tension.

Again, FIGS. 5A and 5B show a single variation of a second deflection device having a shock member. Any number of modifications to the shock member can be made to adjust the spring and damping rates of the second displacement device. For example, such changes include, but are not limited to, the thickness of the shock member, the durometer of the elastomer material, the number of mounting bolts 52, and the size, location, and number of holes 60, pockets, or other surface or body features.

Figure 6A:
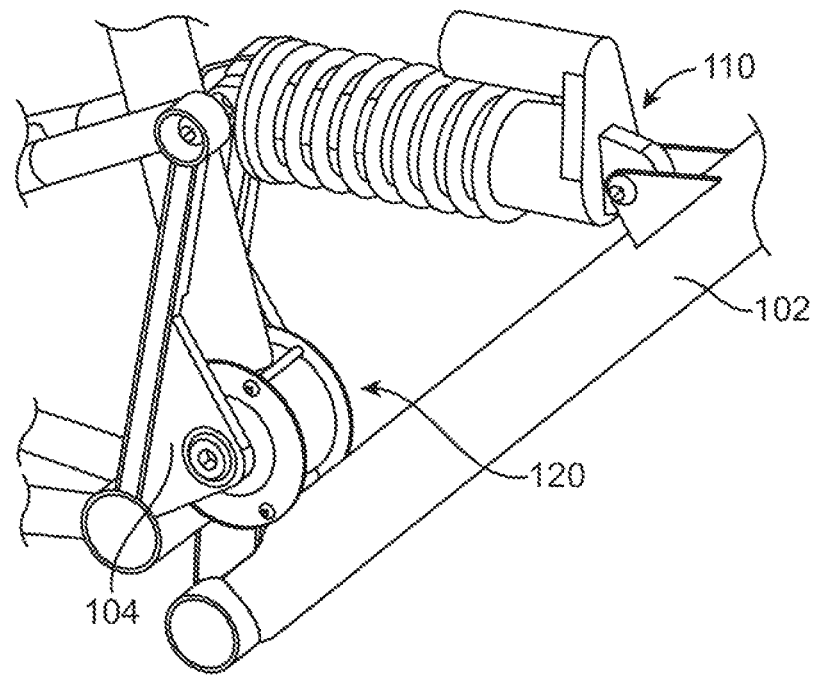
FIG. 6A shows another variation of a dual suspension configuration having a first deflection device and a second deflection device.

FIG. 6A shows another variation of a dual suspension configuration having a first deflection device 110 and a second deflection device 120 to function similar to that described above for coupling a main frame portion 102 with a swing arm assembly 104. However, in this example, the second deflection member 120 comprises a flexible elastomeric structure that is capable of providing both a shock absorbing function and a displacement function. In this variation, the second deflection device 120 does not necessarily require a second bearing. However, alternate variations of the deflection device can easily incorporate a bearing if so required.

Figure 6B:
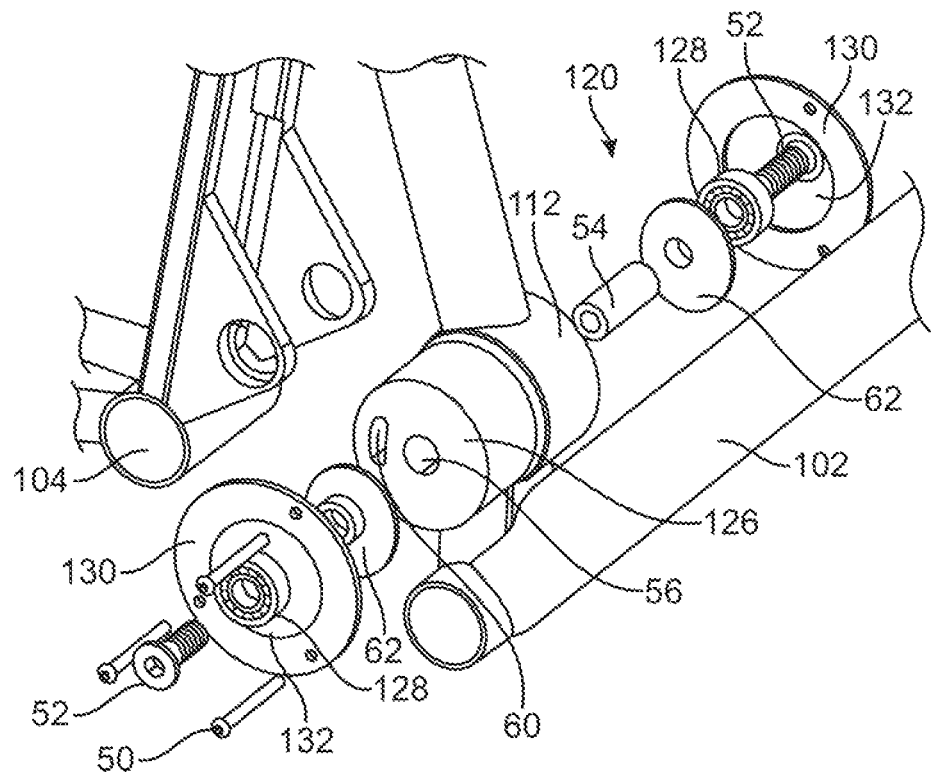
FIG. 6B shows an exploded assembly view of the second deflection device depicted in FIG. 6A.

FIG. 6B shows an exploded assembly view of the second deflection device 120 depicted in FIG. 6A. In this variation, the deflection device 120 includes a first pivot bearing 128 for coupling the swing arm 104 in a manner similar to that described above. The first pivot bearing 128 can be mounted in any number of ways as is understood by those skilled in the art. In the illustrated variation, the first pivot bearing is mounted using a pivot boss 62 on each side with a spacer 54. The second displacement device can also include any number of housing components 130 or similar structures that retain or house the remaining components of the displacement device. In this example, the housing component 130 comprises a plate, ring or collar structure that contains a clearance area 132 to limit motion of the pivot boss 62 as it moves when the swing arm assembly 104 causes deflection of the shock member 126. Accordingly, the clearance area 132 can also optionally limit displacement of the shock member 126.

This variation of the displacement device includes a shock member 126 that functions as a damper and displacement mechanism as well as eliminates the need for a torsional bearing. In this variation, the shock member 126 is coupled to the main frame portion 102 by being housed within a portion 112 of the main frame 102 and forms the frame end of the second deflection device. The swing arm assembly 104 couples to one of the first pivot bearings 128 that are coupled to either side of this variation of the second deflection device 120. Accordingly, the pivot bearings 128 and fasteners 52 form the swing arm end of the second deflection device 120. This variation of the second deflection device can also include an optional spacer 54 located through a central opening 56 of the shock member 126. In addition, the shock member 126 can include one or more through holes 60 as described above to achieve the desired performance characteristics. Any of the shock members described herein can include any number of through-holes, pockets, or other features that promotes desired deflection, torsion, compression, or tension of the shock member. In addition, the shock member can be tuned by selecting a particular the thickness, the durometer of the elastomer material, the number of mounting bolts 52, and the size, location, and number of holes 60, pockets, or other surface or body features.

Figure 6C:
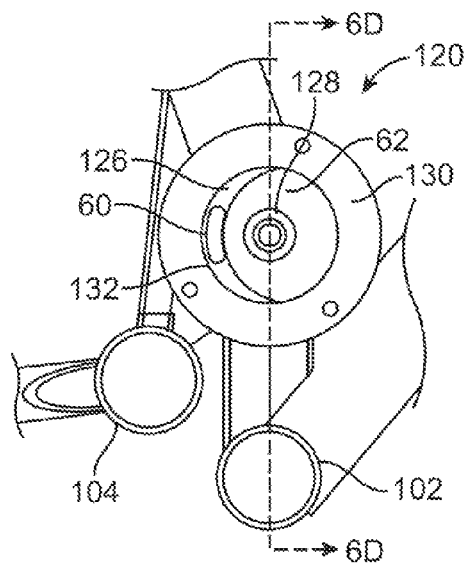
FIG. 6C shows a side view of the displacement device of FIG. 6B.
Figure 6D:
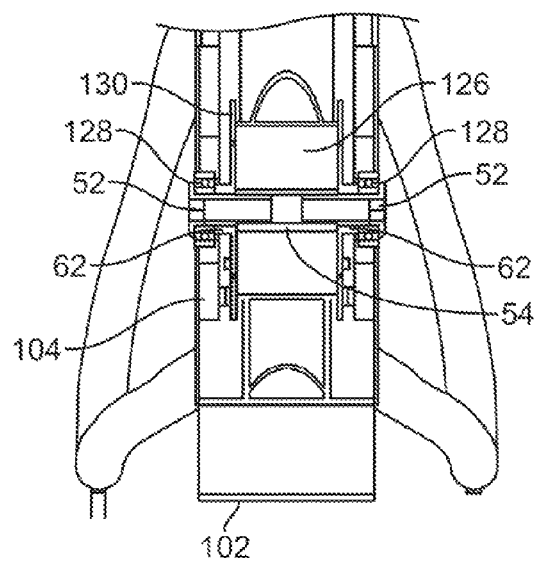
FIG. 6D shows a cross sectional view of the displacement device taken along line 6D-6D of FIG. 6C.

FIG. 6C shows a side view of the displacement device of FIG. 6B and FIG. 6D shows a cross sectional view of the displacement device taken along line 6D-6D of FIG. 6C. FIG. 6C shows the displacement device 120 in a neutral position without significant lateral displacement of the shock member 126. As illustrated, the housing ring or plate 130 includes a clearance area 132 that can limit movement of the pivot boss 62. Clearly, the displacement of the deflection device 120 can be tuned by any number of factors, including but not limited to, modification of the clearance area 132 (via size, shape, etc.), modification of the size and/or shape of the pivot boss 62, as well as by the use of any spacers or other adjustments readily apparent by those skilled in the art.

Figure 6E:
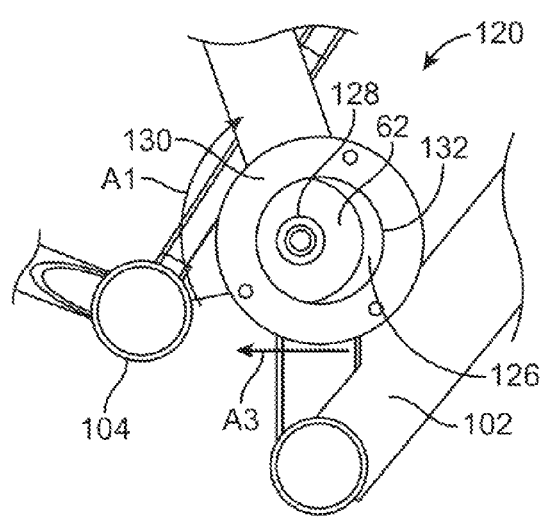
FIG. 6E illustrates one example of displacement of the shock member, pivot boss, and pivot bearing as a result of movement A3.

FIG. 6E illustrates one example of displacement of the shock member 126, pivot boss 62, and pivot bearing 128 as a result of movement A3. As noted similarly above, movement A3 acts on the rear wheel and is transferred by the swing arm 104 to the first pivot bearing 128. In this illustration, the bracket of the swing arm 104 used to couple the swing arm 104 to the deflection device 120 is not shown for purposes of clarity. As A3 causes rearward movement (or any lateral movement), the shock member 126 displaces until clearance area 132 limits the movement of the pivot boss 62. In additional variations, the deflection device 120 does not require a clearance area, instead the shock member 126 can be used to limit movement. Alternatively, any number of stops can be incorporated into shock assembly 126 where the stops can be used to limit movement of the shock assembly 126 against a housing plate 130 or other portion of the bicycle.

FIG. 6E also represents that vertical movement A1 of the swing arm can occur independently as a result of the first pivot bearing 128. Clearly, such vertical and lateral movement can occur independently.

Figure 6F:
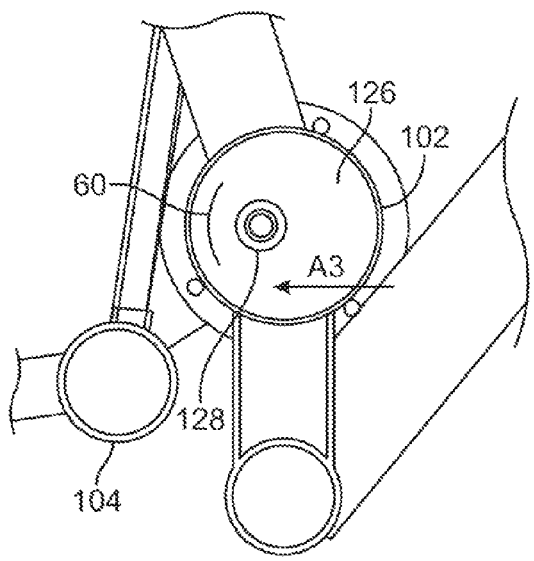
FIG. 6F is intended to illustrate the displacement of a shock member.

FIG. 6F is intended to illustrate the displacement of the shock member. For sake of clarity, the shock member 126 and first pivot bearing 128 without the housing plate or bracket of the swing arm are omitted from the view. FIG. 6F shows displacement of the shock member 126 as a result of movement A3 that is transmitted through the connection of the swing arm coupling (not shown) at the first pivot bearing 128. Displacement of the shock member 126 causes the through-hole 60 to compress. Accordingly, the shock member 126 experiences compression and tension on opposing sides.

Figure 7A:
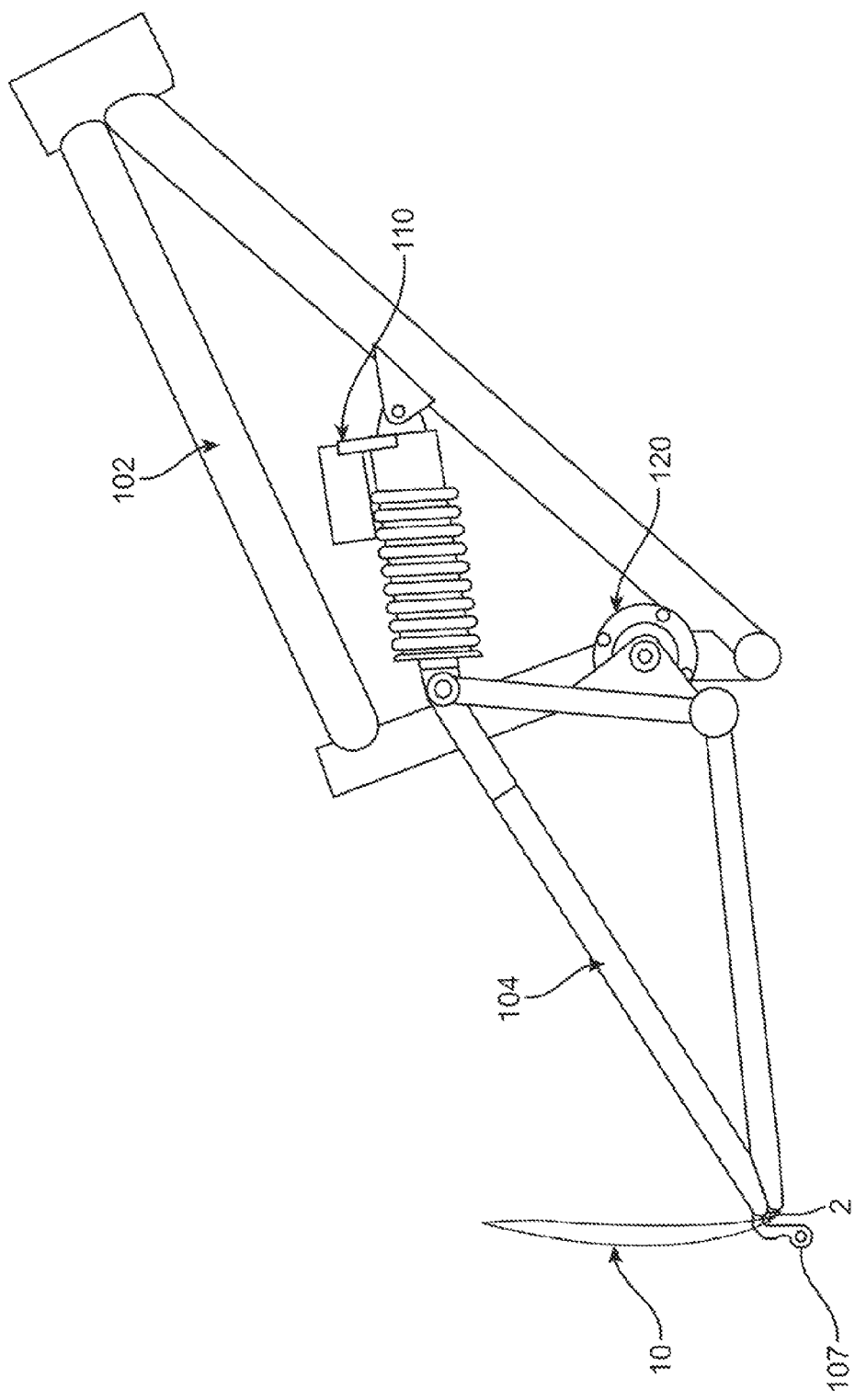
FIGS. 7A to 7D illustrate a path of movement or curve of a rear axle through four extreme positions depending on the displacement of the various displacement devices.

FIGS. 7A to 7D illustrate a path of movement or curve 10 having four extreme positions 2, 4, 6, and 8 depending on the displacement of the various displacement devices. The principles discussed above with respect to FIGS. 3A to 3D are similar to that shown in FIGS. 7A to 7D while the degree of displacement of each position 2, 4, 6, and 8 can vary as required. FIG. 7A illustrates the first and second displacement devices 110 and 120 coupling a main frame portion or assembly 102 to a swing arm portion or assembly 104. In FIG. 7A the suspension system is at an initial position resulting in rear wheel axle 107 located at position 2.

Figure 7B:
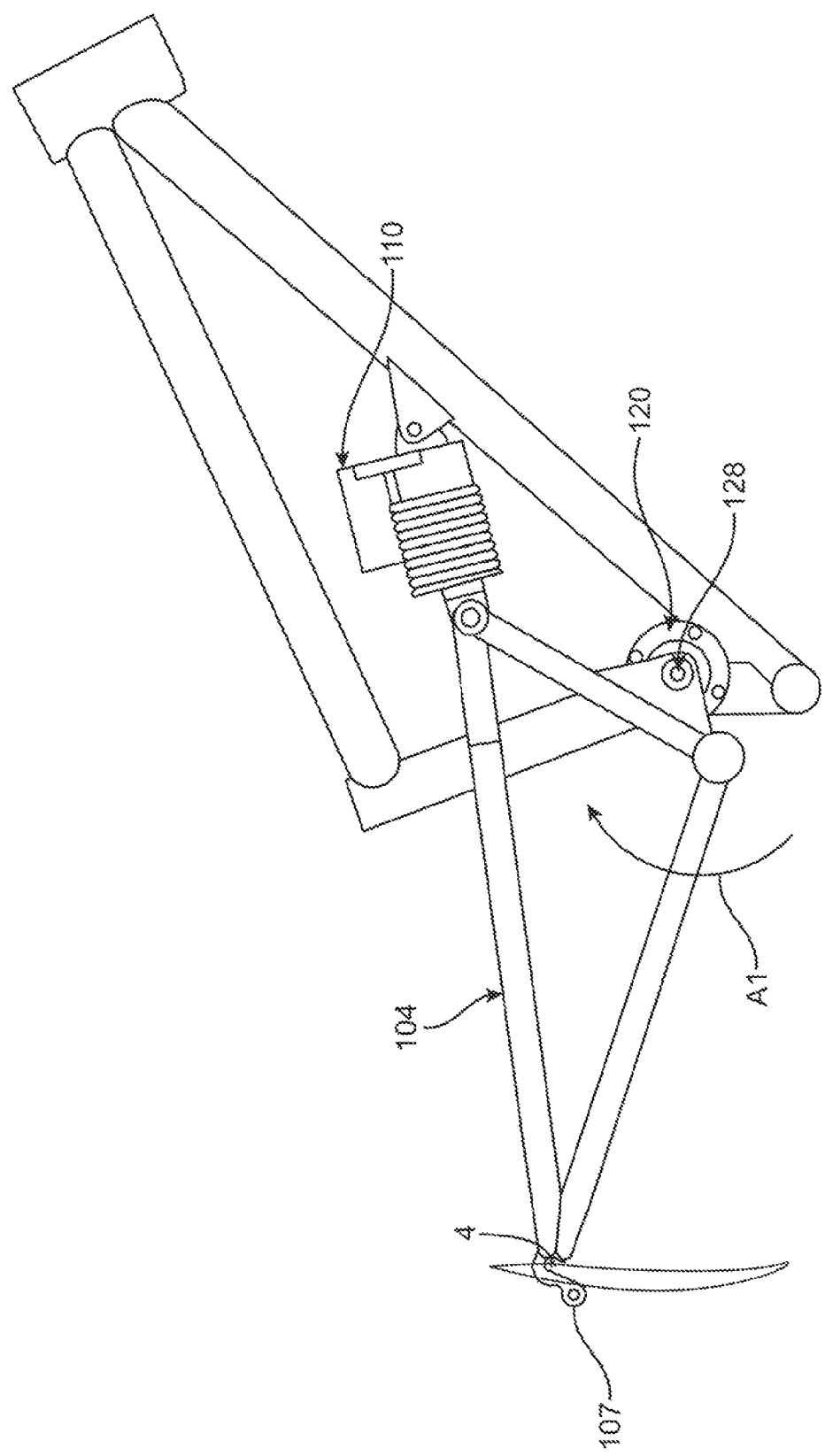

FIG. 7B illustrates the condition where movement A1 drives axle 107 in a vertical direction or arc. This movement causes movement of the first displacement device 110 along its axis to move rear axle 108 to position 4. In the illustrated example, the movement causes compression of the first displacement device 110. Because the second displacement device 120 includes a first pivot bearing 128, movement of the swing arm 104 in the vertical direction or arc can occur with or without displacement of the shock member located within the second displacement device. As noted above, this feature permits independent movement of the swing arm assembly (especially the portion coupled to the second deflection device) in either a horizontal or vertical direction or arc.

Figure 7C:
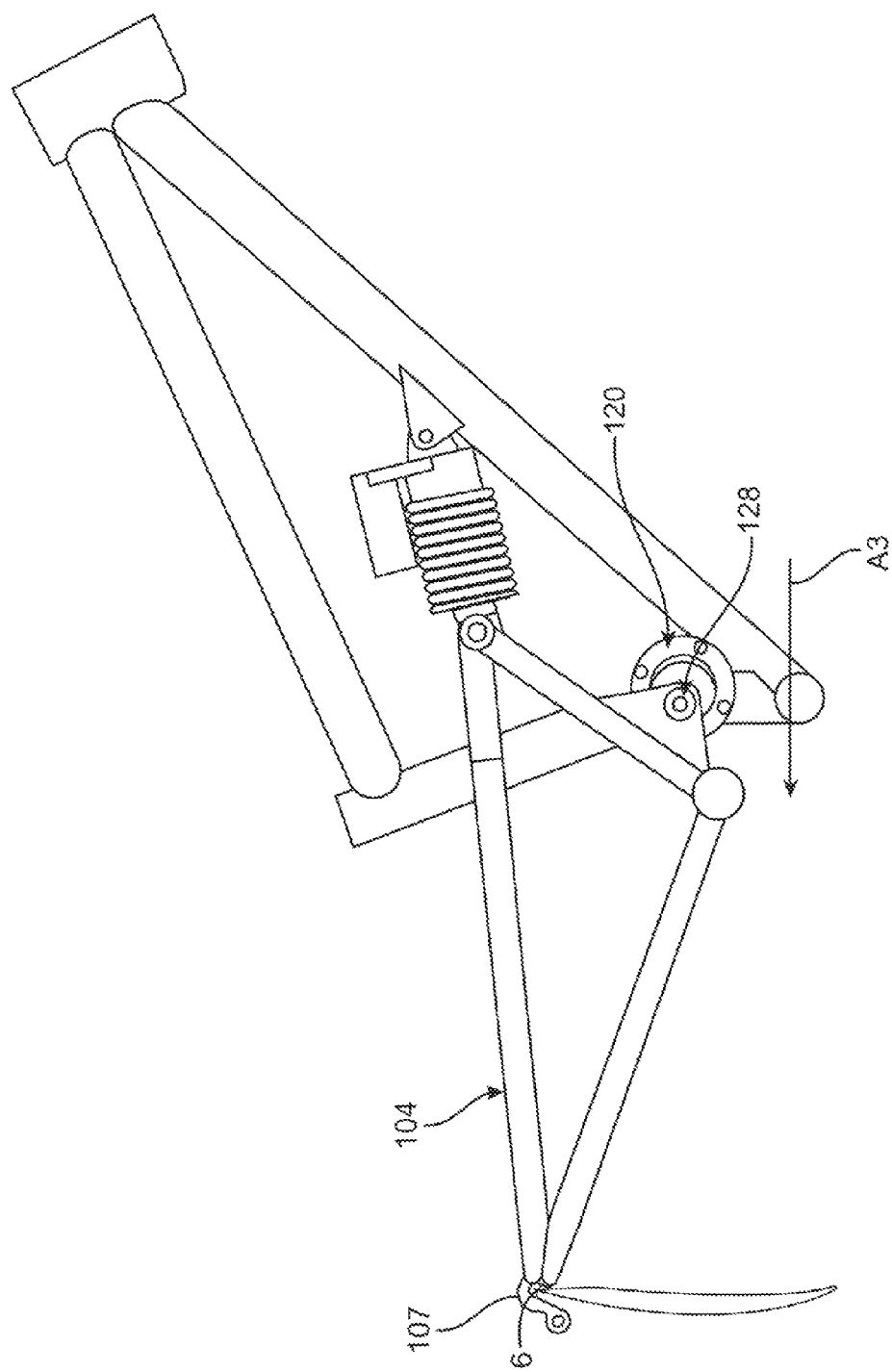
Figure 7D:
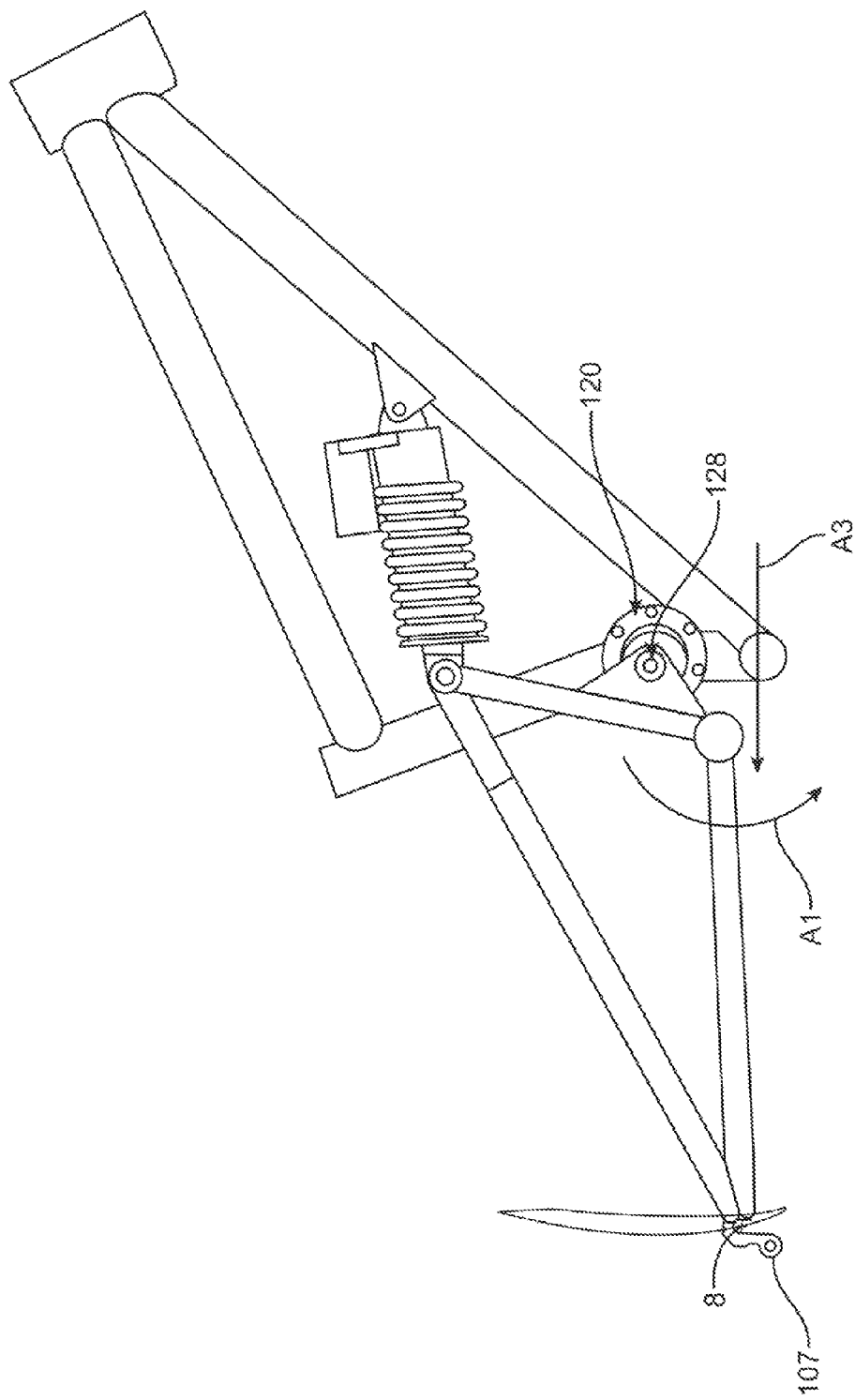

FIG. 7C shows the situation where swing arm assembly 104 is still driven vertically as shown in FIG. 7B, however, lateral movement A3 of the rear wheel (as transferred by rear wheel axle 107 and the swing arm assembly 104 results in lateral or horizontal displacement of the first pivot bearing 128 and displacement of the shock assembly. This action moves rear axle 107 to position 6. FIG. 7D illustrates the condition after the rear axle retreats from vertical movement A1 but while rear axle 107 is still subject to movement A3. As a result, rear axle moves to position 8.

Figure 8:
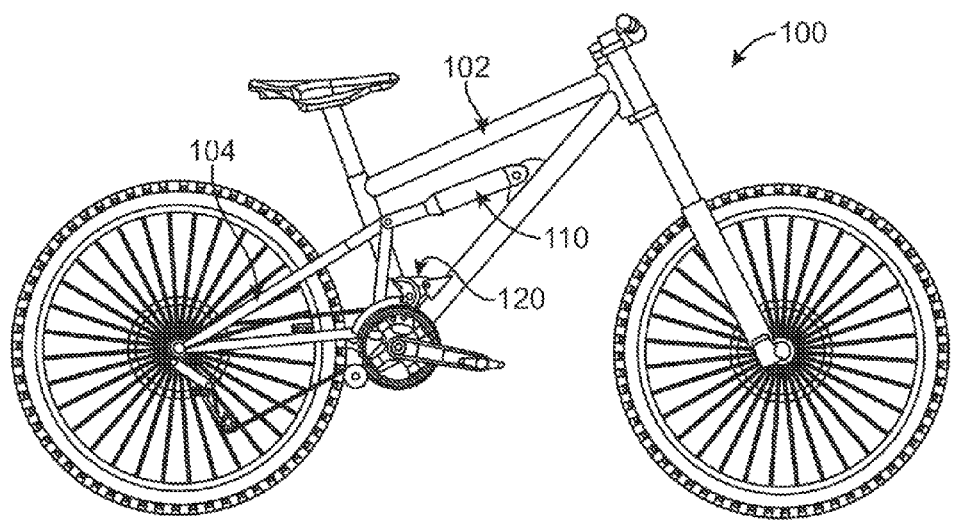
FIG. 8 illustrates yet another variation of a suspension system for providing the benefits as discussed herein.

FIG. 8 illustrates yet another variation of a suspension system for providing the benefits as discussed herein. In this variation, the suspension system includes a first and second displacement device 110 and 120 where the second displacement device 120 can comprise any of the variations discussed herein as well as modifications or combinations of such variations. The first displacement device 110 can include a shock absorber or damper including but not limited to hydraulic, pneumatic, coil sprung, non-spring based, elastomerically damped or any conventional shock or damper configuration that provides the desired spring, damping, and displacement properties required.

Figure 9A:
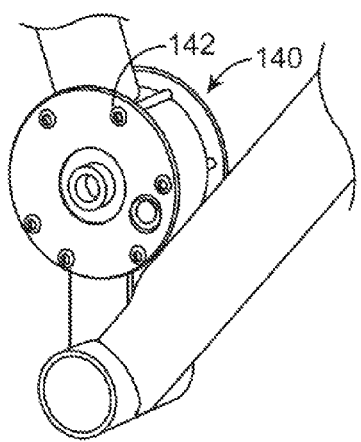
FIGS. 9A and 9B illustrate oblique views of additional variations of a displacement device according to the present disclosure.
Figure 9B:
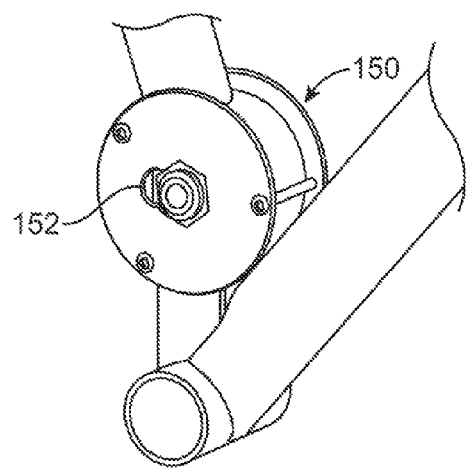

FIGS. 9A and 9B illustrate oblique views of additional variations of a displacement device according to the present disclosure. For example, FIG. 9A shows a displacement device 140 having additional plates 142 that act as thrust bearing surfaces and which increase the lateral stiffness of the frame assembly. FIG. 9B illustrates another displacement device 150 having a slotted plate 152 configuration that acts as a linear bearing.

Figure 10A:
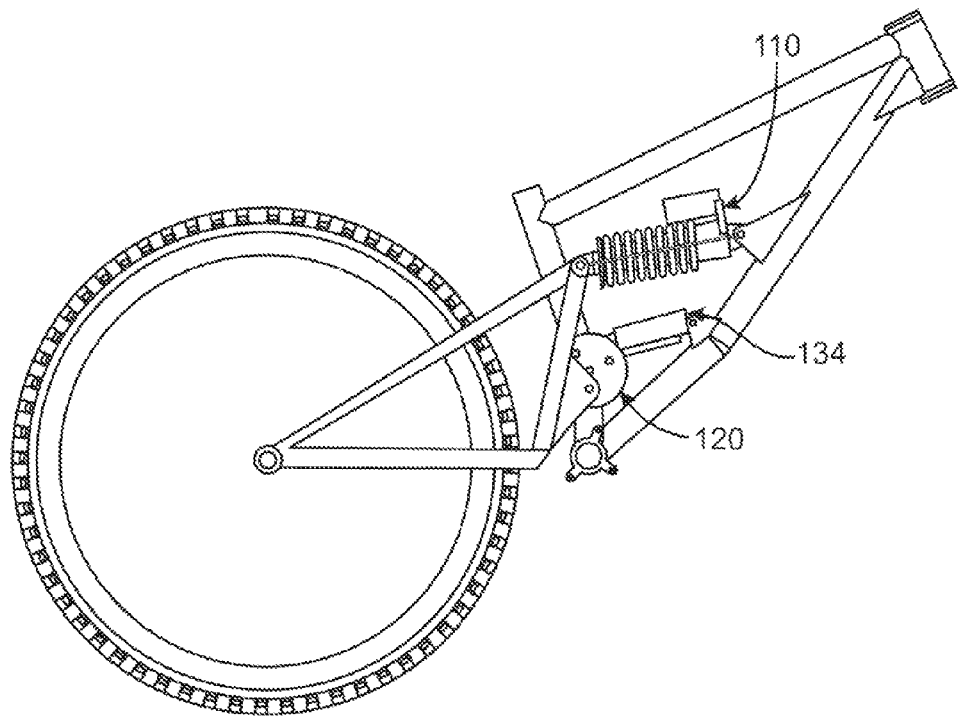
FIGS. 10A and 10B illustrate yet another variation of a suspension assembly.
Figure 10B:
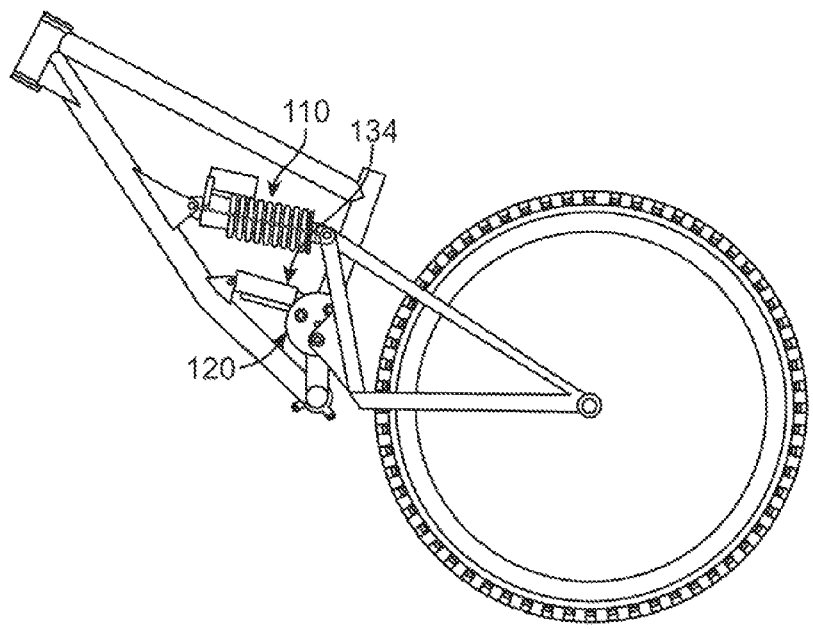
Figure 10C:
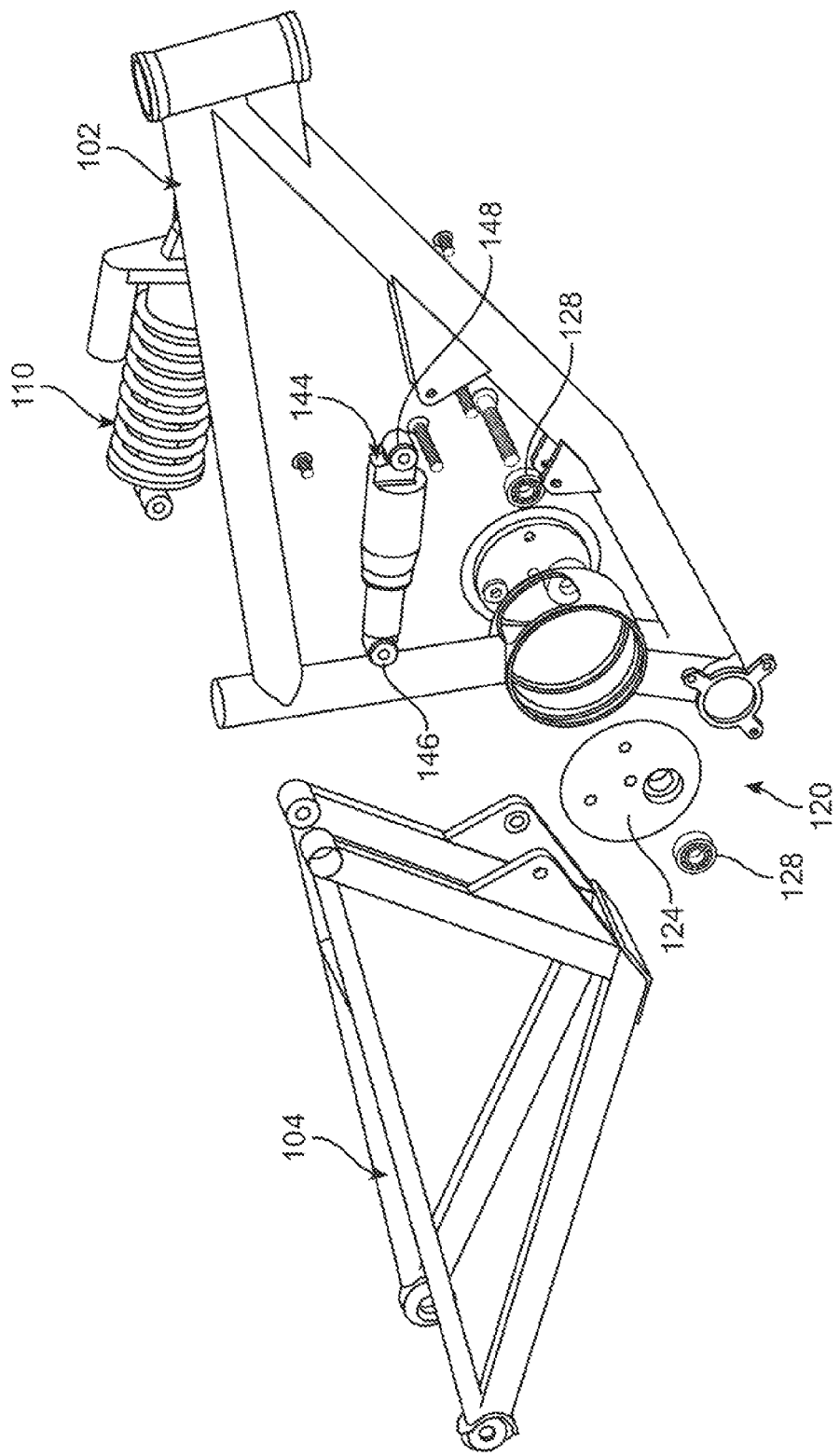
FIG. 10C shows an exploded view of the variation shown in FIG. 10A.

FIGS. 10A and 10B illustrate yet another variation of a suspension assembly described herein where the second displacement device 120 includes a spring and damper 134 as a shock. FIG. 10C illustrates an exploded view of the variation shown in FIG. 10A. As illustrated this variation replaces an elastomeric shock member with a pneumatic piston 144 (alternatively or in combination, the shock member can be spring based). A first side 146 of the piston 144 couples to a transfer plate 124 while a second side 148 of the piston 144 couples to the main frame 102. The swing arm 104 couples to pivot bearings 128 as noted above. In the illustrated variation one or more transfer plates 124 allow for movement of the swing arm 104 as needed. The transfer plate 124 can be optionally coupled to one or more large bearings to facilitate movement. FIG. 10C also illustrates a first deflection device 110 for coupling a second portion of the main frame 102 to the swing arm 104.

Each of the figures diagrammatically illustrates aspects of the invention. To facilitate understanding, the same reference numerals have been used (where practical) to designate similar elements that are common to the figures. Some such numbers have, however, been omitted.

While any of the features or advantages described in connection with the present invention may be provided, it may be the case that only some are employed. Whatever the case, the present invention includes systems comprising any of the features described herein (and/or "consisting" of any such features). Stated otherwise, it is specifically contemplated that any optional feature of the inventive embodiments/variations described herein may be set forth and claimed independently, or in combination with any one or more of the features described herein. Further, methodology described in association with the devices disclosed also forms part of the invention. The invention also comprises such hardware (e.g., built-up bicycles) and methodology as may be used in connection with that described which is incorporated by reference Though the invention has been described in reference to certain examples optionally incorporating various features and depicted in reference to a single example, the invention is not to be limited as such. Numerous modifications and/or additions to or adaptations of the above described embodiments may be apparent to one skilled in the art; it is intended that the scope of the present inventions extend to all such modifications and/or additions.

We claim:

1. A bicycle suspension system for use with a bicycle having a main frame assembly and a swing arm assembly, the system allowing improved movement of a wheel coupled to the swing arm assembly, the suspension system comprising:

a first deflection device coupling the swing arm assembly to the main frame assembly at a first coupled location, where the first deflection device is configured to allow relative motion between the swing arm assembly and the main frame;

a second deflection device coupling the swing arm assembly to the main assembly at a second coupled location where the second deflection device comprises a shock member comprising an elastomeric material, the shock member coupled to the main frame assembly at the frame portion of the second deflection device, where deflection of the shock member results in movement of the swing arm in the horizontal direction;

at least a first pivot bearing mechanically coupled to a portion of the shock member;

where a frame end of the first deflection device is pivotally coupled to the main frame assembly and a swing arm end of the first deflection device is pivotally coupled to the swing arm assembly;

where a frame portion of the second deflection device is coupled to the main frame assembly and a swing arm portion of the second deflection device is coupled to the swing arm assembly such that the second deflection device permits relative movement between the swing arm assembly and the main assembly independently in either a horizontal direction or a vertical direction;

a second pivot bearing coupling the first pivot bearing to the portion of the shock member, where rotation of the second pivot bearing is driven by torsion of the portion of the shock member, where the rotation of the second pivot bearing and rotation of the first pivot bearing permits movement of the swing arm in the horizontal direction a pivot boss coupled to the shock member the pivot boss also being coupled to the second pivot bearing such that deflection of the shock member causes movement of the second pivot bearing; and a frame plate coupled to the main frame assembly at the frame portion of the second deflection device, where the frame plate comprises defines an opening that limits movement of the pivot boss or second pivot bearing to limit movement of the shock member.

2. The bicycle suspension system of claim 1, where the second deflection device comprises at least a first pivot bearing located at the swing arm portion of the second delivery device, where the first pivot bearing allows movement of the swing arm assembly in the vertical direction upon rotation of the swing arm assembly about an axis of the first pivot bearing.

3. The bicycle suspension system of claim 1, where the shock member is housed in a portion of the main frame assembly.

4. The bicycle suspension system of claim 1, where the shock member comprises a circular shape.

5. The bicycle suspension system of claim 1, where a first portion of the shock member comprises at least one opening or cavity that increases deflection of at least a second portion of the shock member.

6. The bicycle suspension system of claim 1, where the first deflection device comprises a shock absorber.

7. The bicycle suspension system of claim 6, where the shock absorber comprises a damper assembly selected from the group consisting of a hydraulic, pneumatic, coil sprung, non-spring based, elastomeric structures.

8. The bicycle suspension system of claim 1, where the horizontal direction comprises a horizontal arcing direction.

9. The bicycle suspension system of claim 1, where the vertical direction comprises a vertical arcing direction.

10. A bicycle comprising:
a main frame assembly;
a swing arm assembly, the swing arm assembly having a rear wheel axis portion for affixing a rear wheel thereto;
a first deflection device mechanically coupling the swing arm assembly to the main frame assembly at a first location;
a second deflection device mechanically coupling the swing arm assembly to the main assembly at a second location, where the second deflection device comprises a shock member comprising an elastomeric material, the shock member coupled to the main frame assembly at the frame portion of the second deflection device, where deflection of the shock member results in movement of the swing arm in the horizontal direction;
a first pivot bearing mechanically coupled to a portion of the shock member;
where a frame end of the first deflection device is pivotally coupled to the main frame assembly and a swing arm end of the first deflection device is pivotally coupled to the swing arm assembly, where the frame end and swing arm end of the first deflection device are moveable relative to each other;
where a frame portion of the second deflection device is coupled to the main frame assembly and a swing portion of the second deflection device assembly is coupled to the swing arm assembly such that the second deflection assembly permits relative movement between the swing arm assembly and the main assembly independently in either a horizontal direction or a vertical direction;
a second pivot bearing coupling the first pivot bearing to the portion of the shock member, where rotation of the second pivot bearing is driven by torsion of the portion of the shock member, where the rotation of the second pivot bearing and rotation of the first pivot bearing permits movement of the swing arm in the horizontal direction;
a pivot boss coupled to the shock member the pivot boss also being coupled to the second pivot bearing such that deflection of the shock member causes movement of the second pivot bearing; and
a frame plate coupled to the main frame assembly at the frame portion of the second deflection device, where the frame plate comprises defines an opening that limits movement of the pivot boss or second pivot bearing to limit movement of the shock member.

11. The bicycle of claim 10, where the second deflection device comprises at least a first pivot bearing located at the swing arm portion of the second delivery device, where the first pivot bearing allows movement of the swing arm assembly in the vertical direction upon rotation of the swing arm assembly about an axis of the first pivot bearing.

12. The bicycle of claim 10, where the opening comprises a shape selected from an ellipse, a circular opening, and a slot.

13. The bicycle of claim 10, where the shock member is housed in a portion of the main frame assembly.

14. The bicycle of claim 10, where the shock member comprises a circular shape.

15. The bicycle of claim 10, where a first portion of the shock member comprises at least one opening or cavity that increases deflection of at least a second portion of the shock member.

16. The bicycle of claim 10, where the first deflection device comprises a shock absorber.

17. The bicycle of claim 10, where the shock absorber comprises a damper assembly selected from the group consisting of a hydraulic, pneumatic, coil sprung, non-spring based, elastomeric structures.

18. A bicycle suspension system for use with a bicycle having a main frame assembly and a swing arm assembly, the system allowing improved movement of a wheel coupled to the swing arm assembly, the suspension system comprising:
a first deflection device coupling the swing arm assembly to the main frame assembly at a first coupled location, where the first deflection device is configured to allow relative motion between the swing arm assembly and the main frame;
a second deflection device coupling the swing arm assembly to the main assembly at a second coupled location;
where a frame end of the first deflection device is pivotally coupled to the main frame assembly and a swing arm end of the first deflection device is pivotally coupled to the swing arm assembly; and
where a frame portion of the second deflection device is coupled to the main frame assembly and a swing arm portion of the second deflection device is coupled to the swing arm assembly such that the second deflection device permits relative movement between the swing arm assembly and the main assembly independently in either a horizontal direction or a vertical direction;

where the second deflection device comprises a shock member comprising an elastomeric material coupled to the main frame assembly at the frame portion of the second deflection device, where deflection of the shock member results in movement of the swing arm in the horizontal direction;

at least a first pivot bearing mechanically coupled to a portion of the shock member;

a second pivot bearing coupling the first pivot bearing to the portion of the shock member, where rotation of the second pivot bearing is driven by torsion of the portion of the shock member, where the rotation of the second pivot bearing and rotation of the first pivot bearing permits movement of the swing arm in the horizontal direction;

a pivot boss coupled to the shock member the pivot boss also being coupled to the second pivot bearing such that deflection of the shock member causes movement of the second pivot bearing;

a frame plate coupled to the main frame assembly at the frame portion of the second deflection device, where the frame plate comprises defines an opening that limits movement of the pivot boss or second pivot bearing to limit movement of the shock member; and where the opening comprises a shape selected from an ellipse, a circular opening, and a slot.

* * * * *